United States Patent
Jalkanen et al.

(10) Patent No.: US 8,210,433 B2
(45) Date of Patent: *Jul. 3, 2012

(54) TERMINAL, METHOD AND COMPUTER PROGRAM PRODUCT FOR INTERACTING WITH A SIGNALING TAG

(75) Inventors: Janne Jalkanen, Helsinki (FI); Heikki Huomo, Oulu (FI); Petri Vesikivi, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/830,164

(22) Filed: Jul. 2, 2010

(65) Prior Publication Data

US 2010/0270369 A1 Oct. 28, 2010

Related U.S. Application Data

(63) Continuation of application No. 10/687,036, filed on Oct. 16, 2003, now Pat. No. 7,775,432.

(51) Int. Cl.
G06K 7/08 (2006.01)
(52) U.S. Cl. .......... 235/451; 235/382; 235/376; 705/22; 455/66.1; 455/517; 709/203; 340/573.1
(58) Field of Classification Search ............ 235/451, 235/382, 376; 705/1, 22; 455/66.1, 517; 709/203; 340/573.1
See application file for complete search history.

(56) References Cited

U.S. PATENT DOCUMENTS

| | | | |
|---|---|---|---|
| 5,530,702 A | 6/1996 | Palmer et al. | |
| 6,816,063 B2 | 11/2004 | Kubler et al. | |
| 7,075,412 B1 | 7/2006 | Reynolds et al. | |
| 7,519,682 B2 | 4/2009 | Smith et al. | |
| 2001/0045460 A1 | 11/2001 | Reynolds et al. | |
| 2002/0021809 A1 | 2/2002 | Salo et al. | |
| 2002/0022961 A1 | 2/2002 | Sepanaho | |
| 2002/0023264 A1 | 2/2002 | Aaltonen et al. | |
| 2002/0069406 A1 | 6/2002 | Aaltonen et al. | |
| 2002/0087997 A1 | 7/2002 | Dahlstrom | |
| 2002/0191998 A1 | 12/2002 | Cremon et al. | |
| 2003/0043041 A1 | 3/2003 | Zeps et al. | |
| 2003/0084177 A1 | 5/2003 | Mulligan | |
| 2003/0097304 A1 | 5/2003 | Hunt | |

(Continued)

FOREIGN PATENT DOCUMENTS

WO    WO 00/67221 A1    11/2000

(Continued)

OTHER PUBLICATIONS

*Radio Frequency Identification RFID—A basic primer*; AIM Inc. White Paper; Aug. 23, 2001; 17 pages; 1.2; The Association of the Automatic Identification and Data Capture Industry (AIM Inc.); WP-98/002R2.

(Continued)

*Primary Examiner* — Allyson Trail
(74) *Attorney, Agent, or Firm* — Alston & Bird LLP (57) ABSTRACT

A terminal for interacting with a signaling tag includes a controller capable of selecting a signaling tag and thereafter receiving a tag type from the signaling tag at least partially over an air interface. The controller is also capable of determining if the terminal is actively operating an application. In this regard, the controller is capable of performing a predefined action based upon the tag type, such as based upon a tag type of "Read Only," "Read/Write" or "Transceiver in Show Mode." And when the controller is actively operating an application, the controller is capable of performing the predefined action further based upon the application and a state of the application.

18 Claims, 4 Drawing Sheets

U.S. PATENT DOCUMENTS

| | | |
|---|---|---|
| 2003/0120745 A1 | 6/2003 | Katagishi et al. |
| 2003/0134653 A1 | 7/2003 | Sarkkinen et al. |
| 2004/0193676 A1 | 9/2004 | Marks |
| 2004/0203413 A1 | 10/2004 | Harumoto |
| 2004/0225199 A1 | 11/2004 | Evanyk et al. |

FOREIGN PATENT DOCUMENTS

| | | |
|---|---|---|
| WO | WO 01/45319 A1 | 6/2001 |
| WO | WO 01/52179 | 7/2001 |
| WO | WO 02/11074 | 2/2002 |

OTHER PUBLICATIONS

Notice and Filing of Opposition in European Patent 1 685 689.
Reply to Notice of Opposition in European Patent 1 685 689.
Office Action for European Application No. 08 006 467.8 dated Nov. 2, 2011.
Widmer, P., *Smart Box Software Framework*, Vision Document, Jul. 4, 2003, 23pages.

TERMINAL, METHOD AND COMPUTER PROGRAM PRODUCT FOR INTERACTING WITH A SIGNALING TAG

CROSS-REFERENCE TO RELATED APPLICATIONS

This application is a continuation of U.S. application Ser. No. 10/687,036, filed Oct. 16, 2003, now U.S. Pat. No. 7,775,432 which is hereby incorporated herein in its entirety by reference.

FIELD OF THE INVENTION

The present invention generally relates to systems and methods of interacting with entities and, more particularly, relates to terminals, methods and computer program products for interacting with a signaling tag to perform an action based on applications capable of operating on the terminal.

BACKGROUND OF THE INVENTION

Computer science researchers have been exploring ideas associated with "smart spaces" or ubiquitous computing for years. One of the most important challenges has been creating new, intuitive user interfaces that are suitable for ubiquitous computing applications, but are not based on traditional personal computing platforms. The challenge is to make these new devices and applications simple and intuitive to use. Donald Norman describes some of the challenges in designing such a user interface in the book, THE INVISIBLE COMPUTER.

In an attempt to address the design challenges of user interfaces suitable for ubiquitous computing applications, there has been significant work in the area of point-and-click user interfaces and the application of point-and-click ideas to ubiquitous computing research. Traditional infrared (IR) remote controls are an obvious example. In this regard, IR remote controls are being developed today to allow users to control a number of different entities from a single controller. Another example of the application of point-and-click ideas to ubiquitous computing research is the "Cooltown" research project within Hewlett-Packard Laboratories. Generally, in accordance with the Cooltown research project, users can interact with entities using wireless communication devices to execute uniform resource locators (URLs) to web resources such that the wireless communication device can thereafter interact with the web resources.

Whereas previous real-world point-and-click techniques allow users to interact with entities in a predetermined manner, such as to control the entity or link to web resources, such techniques are inflexible. In this regard, most systems employing such techniques are single purpose devices. For example, Cooltown uses wireless communication devices to achieve limited, multi-application, point and click functionality. Cooltown protocols are used to send and receive URLs and these URLs are assumed to point to HTML documents. Cooltown can be thought of as a sort of real-world, web browsing system. The flexibility of this approach is limited, however, because it is based on URLs that only point to web resources.

SUMMARY OF THE INVENTION

In light of the foregoing background, embodiments of the present invention provide an improved terminal, method and computer program product for interacting with signaling tags, such as Radio Frequency Identification (RFID) transponder tags, radio frequency transponders operating as RFID transponder tags, or the like. Embodiments of the present invention create a "point-and-click" style of user interface for ubiquitous computing applications that is based on the use of a terminal, such as a mobile station or portable digital assistant (PDA). Generally, embodiments of the present invention permit terminal users to use a terminal to select electronic tags from which the terminal can read data and/or to which the terminal can write data. Based upon a tag type indicating the tag as being capable of transmitting and/or receiving data, the terminal can perform predefined actions. Advantageously, the terminal can be capable of actively operating an application, such as a software application, and as such, the terminal can be capable of performing the predefined action further based upon the application and the state of the application, such as being in a state of receiving or presenting data.

As indicated above, a signaling tag can comprise a transceiver capable of operating as an electronic tag, where the transceiver is associated with an electronic device. In such instances, the terminal can perform predefined actions such as by reading data from and/or writing data to the electronic device associated with the transceiver. Instead of reading data from and/or writing data to the associated device via the transceiver, the terminal can advantageously be capable of reading data from and/or writing data to the associated device in a manner independent of the transceiver. For example, when the transceiver comprises a radio frequency transceiver, the terminal can be capable of reading data from and/or writing data to the associated device in a manner such as in accordance with infrared, Bluetooth, or any of a number of different wireless networking techniques, including WLAN techniques.

According to one aspect of the present invention, a terminal is provided for interacting with a signaling tag. The terminal includes a controller capable of selecting a signaling tag and thereafter receiving a tag type from the signaling tag at least partially over an air interface. The controller is also capable of determining if the terminal is actively operating an application. In this regard, the controller is capable of performing a predefined action based upon the tag type, and when the controller is actively operating an application, further based upon the application and the state of the application. More particularly, the controller can be capable of reading data from the signaling tag into an actively operating application when the tag type (e.g., "Read Only," "Read/Write") designates the signaling tag as being capable of transmitting data to the terminal, the controller is actively operating an application, and the application is in a state of receiving data.

When the tag type (e.g., "Read Only," "Read/Write") designates the signaling tag as being capable of transmitting data to the terminal and either (a) the controller is not actively operating an application, or (b) the controller is actively operating an application in a state other than a state of receiving data, the controller can be capable of reading data from the signaling tag into the terminal, such as to store the data into the terminal. When the tag type (e.g., "Read/Write") designates the signaling tag as being capable of receiving data, the controller is actively operating an application, and the application is in a state of presenting data, the controller can be capable of writing data to the signaling tag. However, when the tag type (e.g., "Read/Write) designates the signaling tag as being capable of receiving data and either (a) the controller is not actively operating an application, or (b) the controller is actively operating an application in a state other than a state of one of receiving data and presenting data, the controller can be capable of reading data from the signaling tag into the terminal.

In various instances, the signaling tag comprises a transceiver capable of operating as an electronic tag, such as an RFID transponder tag, where the transceiver is associated with a device. In such instances, when the tag type designates the signaling tag as comprising the transceiver, the controller is actively operating an application, and the application is in a state of receiving data, the controller can be capable of reading data from a device associated with a transceiver into the actively operating application. Advantageously, the controller can be capable of reading data from the device in a manner independent of the transceiver. When the tag type designates the signaling tag as comprising the transceiver, the controller is actively operating an application, and the application is in a state of presenting data, the controller can be capable of writing data to the device associated with the transceiver. Similar to instances in which the controller reads data from the device, the controller can be capable of writing data to the device in a manner independent of the transceiver.

When the tag type designates the tag as comprising the transceiver and either (a) the controller is not actively operating an application, or (b) the controller is actively operating an application in a state other than a state of one of receiving data and presenting data, the controller can be capable of initiating communication with the device associated with the transceiver. Advantageously, in a manner similar to reading data from and/or writing data to the device, the controller can be capable of initiating communication with the device in a manner independent of the transceiver.

A method and computer program product for interacting with a signaling tag are also provided. Embodiments of the present invention therefore provide a terminal, method and computer program product for interacting with signaling tags, such as RFID transponder tags and/or radio frequency transceivers. In contrast to conventional computing systems, embodiments of the present invention allow the terminal to perform different predefined actions, such as reading data to and/or writing data from the signaling tag or a device associated with a signaling tag comprising a transceiver, by selecting different signaling tags. As such, the terminal, method and computer program product of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
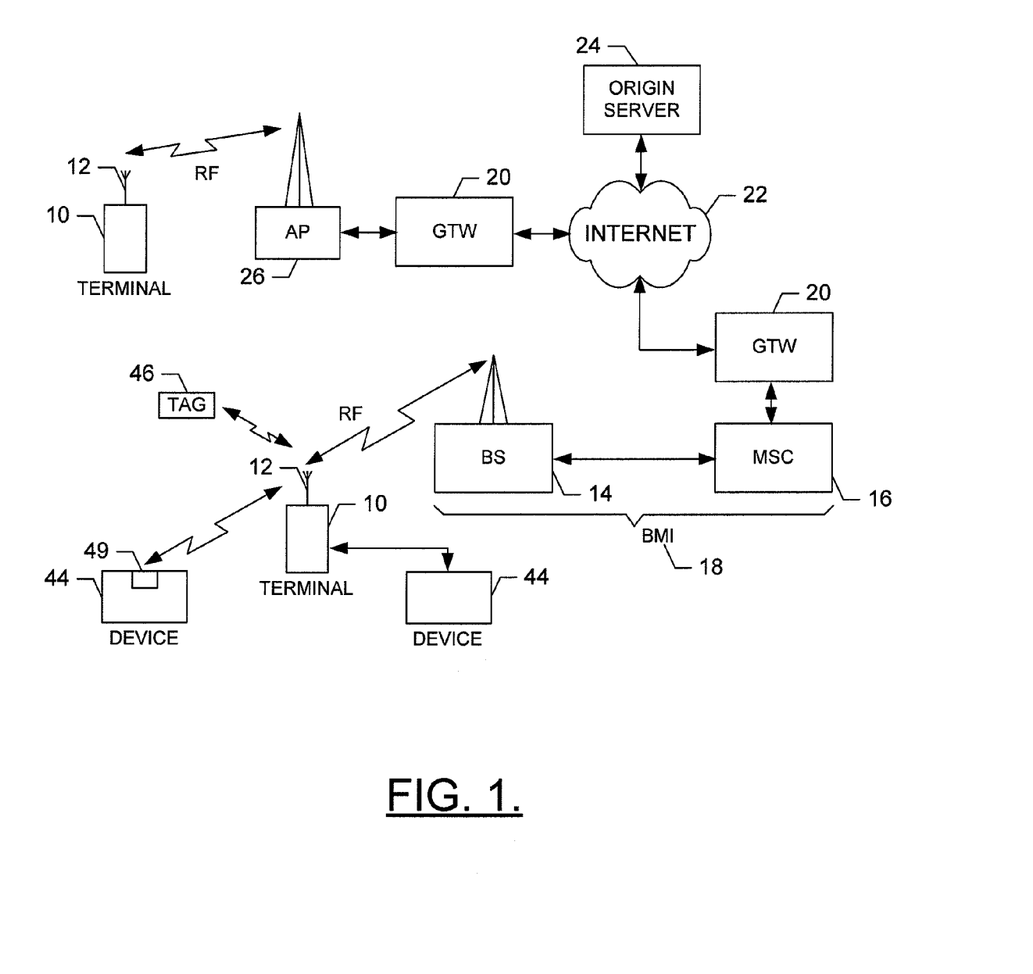
FIG. 1 is a block diagram of one type of terminal and system that would benefit from embodiments of the present invention.

Referring to FIG. 1, an illustration of one type of terminal and system that would benefit from embodiments of the present invention is provided. The system, terminal and method of embodiments of the present invention will be primarily described in conjunction with mobile communications applications. It should be understood, however, that the system and method of the present invention can be utilized in conjunction with a variety of other applications, both in the mobile communications industries and outside of the mobile communications industries. For example, the system and method of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI) 18. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 20 (Gateway).

The MSC 16 can be coupled to a network, such as a local area network (LAN), a metropolitan area network (MAN), and/or a wide area network (WAN). The MSC can be coupled to the network directly, or if the system includes a GTW 20 (as shown), the MSC can be coupled to the network via the GTW. In one typical embodiment, for example, the MSC is coupled to the GTW, and the GTW is coupled to a WAN, such as the Internet 22. In turn, devices such as processing elements (e.g., personal computers, server computers or the like) can be coupled to the terminal 10 via the Internet. For example, the processing elements can include one or more processing elements associated with an origin server 24. Additionally, the network may be coupled to one or more wireless access points (APs) 26, which may be wirelessly coupled to one or more terminals 10. By directly or indirectly connecting the terminals and the other devices (e.g., origin server) to the Internet, the terminals can communicate with the other devices and with one another, such as according to the Hypertext Transfer Protocol (HTTP), to thereby carry out various functions of the terminal.

Figure 2:
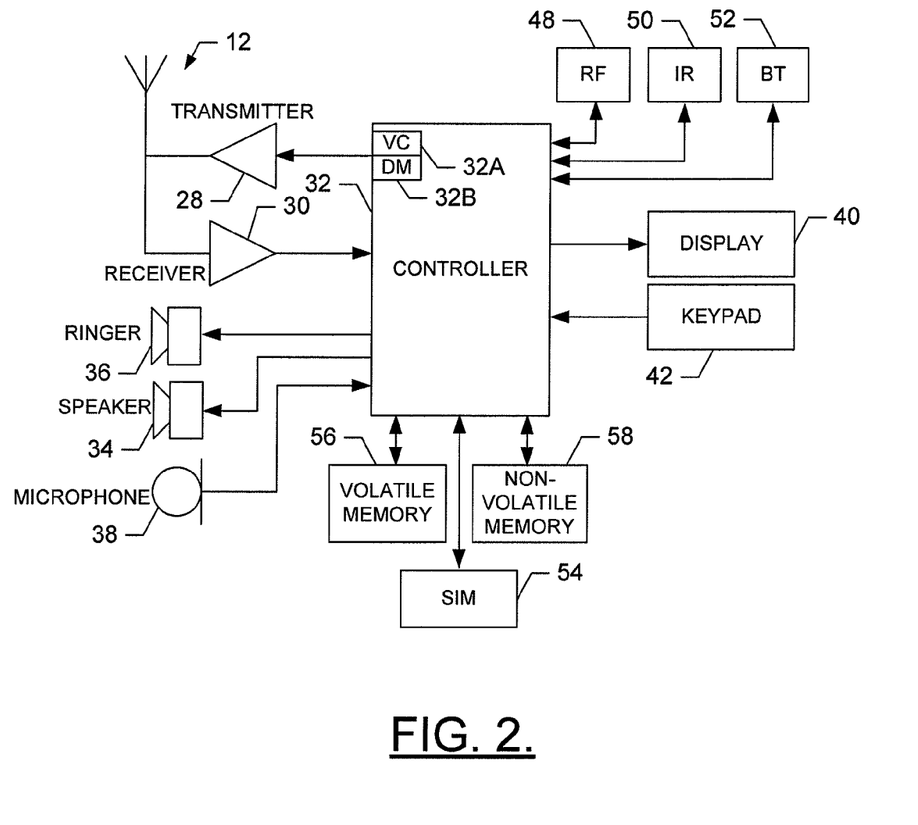
FIG. 2 is a schematic block diagram of a terminal comprising a mobile station, in accordance with one embodiment of the present invention.

Reference is now made to FIG. 2, which illustrates one type of terminal 10, a mobile station, that would benefit from embodiments of the present invention. It should be understood, however, that the mobile station illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

As shown, in addition to an antenna 12, the mobile station includes a transmitter 28, a receiver 30, and a controller 32 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Some narrowband AMPS (NAMPS), as well as TACS, mobile terminals may also benefit from the teaching of this invention, as should dual or higher mode phones (e.g., digital/analog or TDMA/CDMA/analog phones).

It is understood that the controller 32 includes the circuitry required for implementing the audio and logic functions of the mobile station. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 32A, and may include an internal data modem (DM) 32B. Further, the controller may include the functionally to operate one or more software programs, which may be stored in memory (described below). For example, the controller may be capable of operating a connectivity program, such as a conventional Web browser. The connectivity program may then allow the mobile station to transmit and receive Web content, such as according to the Hypertext Transfer Protocol (HTTP) and/or the Wireless Application Protocol (WAP), for example.

The mobile station also comprises a user interface including a conventional earphone or speaker 34, a ringer 36, a microphone 38, a display 40, and a user input interface, all of which are coupled to the controller 32. The user input interface, which allows the mobile station to receive data, can comprise any of a number of devices allowing the mobile station to receive data, such as a keypad 42, a touch display (not shown) or other input device. In embodiments including a keypad, the keypad includes the conventional numeric (0-9) and related keys (#, *), and other keys used for operating the mobile station. Although not shown, the mobile station can include a battery, such as a vibrating battery pack, for powering the various circuits that are required to operate the mobile station, as well as optionally providing mechanical vibration as a detectable output.

The mobile station can also include one or more means for sharing and/or obtaining data from electronic devices 44, tags 46 or the like. As will be appreciated, the electronic devices and tags can comprise any of a number of different known devices and tags capable of transmitting and/or receiving data in accordance with any of a number of different wireline and/or wireless techniques. For example, the electronic devices can comprise any of a number of different terminals 10, including other mobile stations, portable digital assistants (PDAs), pagers, laptop computers and other types of electronic systems. Likewise, for example, the tags can comprise Radio Frequency Identification (RFID) transponder tags or the like.

As shown in FIG. 2, the mobile station can include a radio frequency (RF) transceiver 48 so that data can be shared with and/or obtained from electronic devices 44 including other radio frequency transceivers (shown as 49 in FIG. 1), and/or RFID transponder tags 46. The mobile station can additionally, or alternatively, include an infrared (IR) transceiver 50, and/or a Bluetooth (BT) transceiver 52 operating using Bluetooth brand wireless technology developed by the Bluetooth Special Interest Group. The mobile station can therefore additionally or alternatively be capable of transmitting data to and/or receiving data from electronic devices and/or tags in accordance with such techniques. Although not shown, the mobile station may additionally or alternatively be capable of transmitting and/or receiving data from electronic devices and/or tags according to a number of different wireless networking techniques, including WLAN techniques such as IEEE 802.11 techniques or the like.

The mobile station can further include memory, such as a subscriber identity module (SIM) 54, a removable user identity module (R-UIM) or the like, which typically stores information elements related to a mobile subscriber. In addition to the SIM, the mobile station can include other removable and/or fixed memory. In this regard, the mobile station can include volatile memory 56, such as volatile Random Access Memory (RAM) including a cache area for the temporary storage of data. The mobile station can also include other non-volatile memory 58, which can be embedded and/or may be removable. The non-volatile memory can additionally or alternatively comprise an EEPROM, flash memory or the like. The memories can store any of a number of pieces of information, and data, used by the mobile station to implement the functions of the mobile station. The memories can also store one or more applications capable of operating on the mobile station.

The applications capable of operating on the mobile station can comprise any of a number of different applications capable of being executed by the controller 32. For example, the applications can include a printing application capable of directing a printer to print an image. Also, for example, the applications can include a payment application capable of transferring funds, such as credit card funds, to an entity capable of receiving the funds. In addition, for example, the applications can include one or more messaging applications, such as an E-mail application, short messaging service (SMS), multimedia messaging service (MMS) application or the like, capable of sending and receiving messages that may include text, images, audio, video and/or other multimedia. The applications are typically embodied in software, but as will be appreciated, one or more applications can alternatively be embodied in firmware, hardware or the like.

In accordance with embodiments of the present invention, the terminal 10 is capable of reading a tag type from a tag 46, and thereafter performing a predefined action based upon the tag type and a state of the terminal. Each tag can have any of a number of different tag types. For example, one or more tags can have the tag type, "Read Only," which designates the respective tag(s) as only being capable of transmitting data to the terminal during operation the method of embodiments of the present invention. Also, for example, one or more tags can have the tag type, "Read/Write," which designates the respective tag(s) as being capable of transmitting data to and/or receiving data from the terminal during operation the method of embodiments of the present invention. In addition, one or more transceivers 49 (e.g., one or more radio frequency transceivers) of one or more other electronic devices 44 may each be capable of operating as a tag during operation of the method of embodiments of the present invention. In such instances, each transceiver operating as a tag can have the tag type "Transceiver in Show Mode," which designates the respective transceiver as being capable of operating as a tag, typically having a "Read Only" tag type. It should be understood, however, that the tag type "Transceiver in Show Mode," tag type can designate the respective transceiver as being capable of operating as a tag having a "Read/Write" tag type. As described herein, the term signaling tag can refer to a tag 46 or a transceiver 49 capable of operating as a tag during operation of embodiments of the present invention.

Figure 3A:
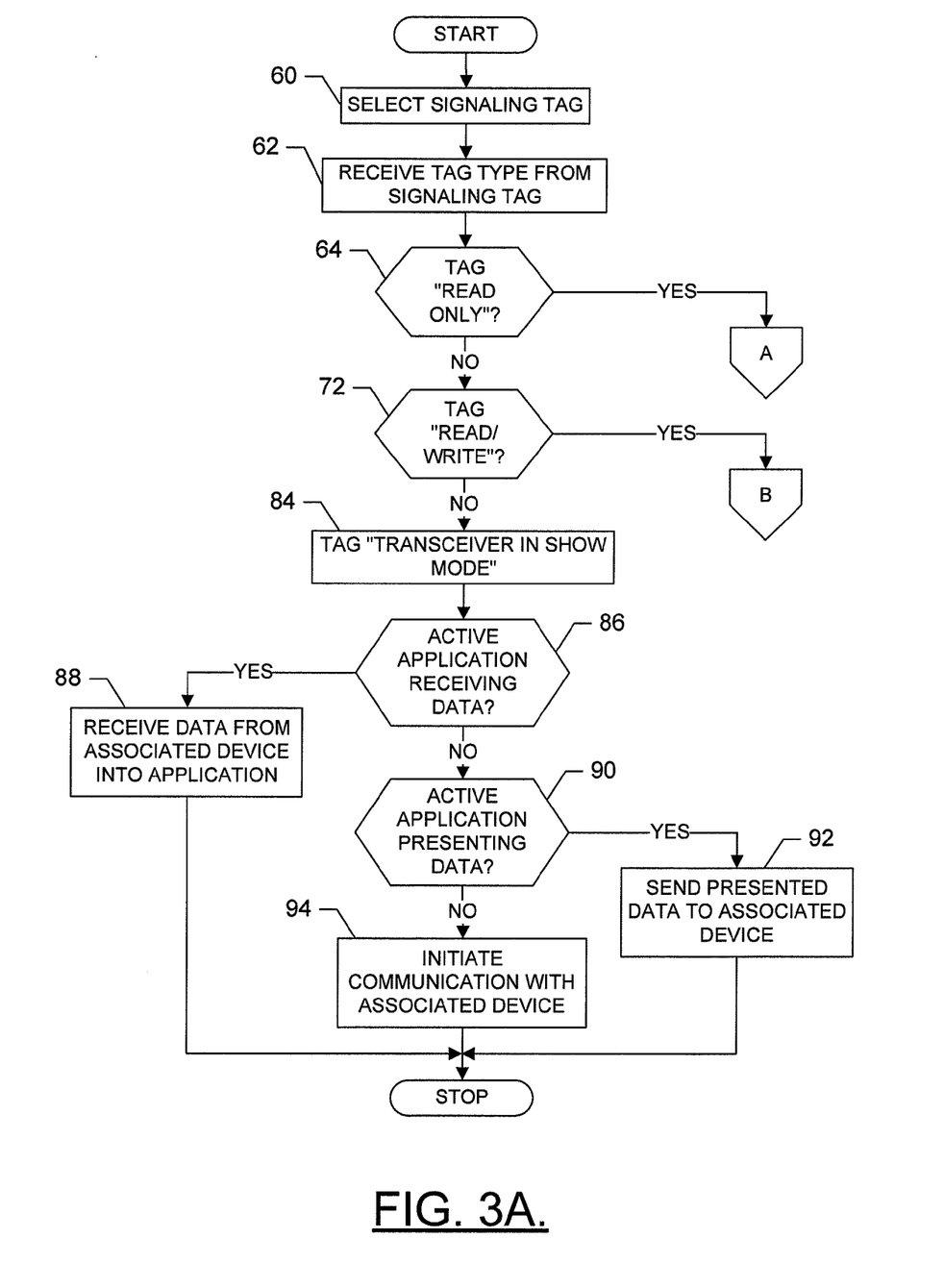
FIGS. 3A-C are flowcharts illustrating various steps in a method of interacting with a signaling tag in accordance with one embodiment of the present invention.
Figure 3B:
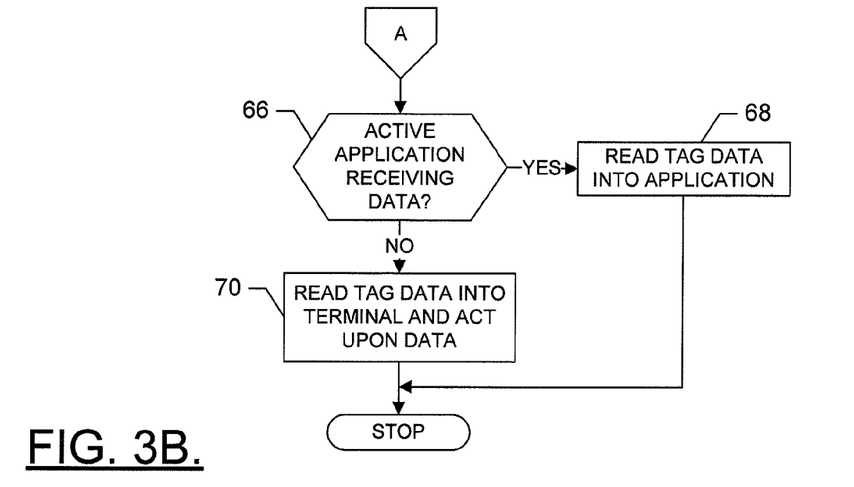
Figure 3C:
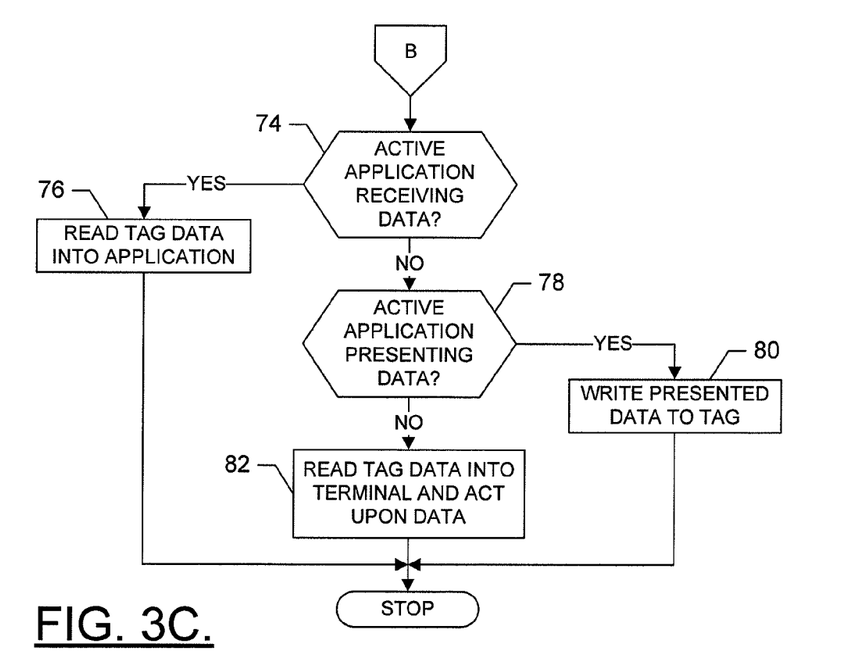

Attention is now drawn to FIGS. 3A-C, which illustrate various steps in a method of interacting with a signaling tag in accordance with an embodiment of the present invention. Generally, the method includes the terminal 10 selecting a signaling tag, i.e., a tag 46 or a transceiver 49 capable of operating as a tag, as shown in block 60. Although the signaling tag can be selected in any of a number of different manners, in one embodiment, the signaling tag is selected by initiating communication with the signaling tag to thereby receive a tag type from the signaling tag. In this regard, the terminal can initiate communication with the signaling tag in any of a number of different manners. For example, when the signaling tag comprises a RFID transponder tag or a radio frequency transceiver operating as a tag, the terminal can initiate communication by passing the terminal within a predefined distance of the RFID tag or radio frequency transceiver and receiving an instruction from a user, such as via a user interface of the terminal, to initiate communication with the signaling tag. Thereafter, the terminal can send a request to the RFID tag for the tag type of the RFID tag.

After selecting the signaling tag, the terminal 10 can receive a tag type from the signaling tag, as shown in block 62. The terminal can receive the tag type in any of a number of different manners, such as via radio frequency transfer from an RFID transponder tag or a radio frequency transceiver. After receiving the tag type, the terminal can perform a predefined action based upon the tag type and a state of the terminal. In this regard, if the signaling tag has a tag type "Read Only" and the terminal is actively operating an application in a state of receiving data, as shown in blocks 64 and 66 of FIG. 3B, the terminal can read data from the tag into the active application, as shown in block 68. If the terminal is not actively operating an application, however, the terminal can read data from the tag into the terminal and act upon the data, as shown in block 70. The terminal can act upon the data in any of a number of different manners. For example, the terminal can store the data, (e.g., into non-volatile memory 58). Additionally, or alternatively, for example, the terminal can initiate an application associated with the data or otherwise identified by the data, and read the data into the initiated application.

As an example of a context in which a signaling tag may have "Read Only" tag type, presume that a RFID transponder tag is embedded in a paper advertisement for a consumer good, where the tag has a tag type "Read Only" and stores data including information regarding the consumer good, such as a description of the consumer good and a uniform resource locator (URL) to a Web site that includes an order form for ordering the consumer good. Also, presume that the data stored by the tag identifies an E-mail application as being associated with the data. If the terminal is actively operating an E-mail application, upon selecting the tag, the terminal can read the information regarding the consumer good into an E-mail composition such that a user of the terminal can E-mail the information to a friend. Alternatively, if the terminal is actively operating a Web browser, the terminal can read the URL from the information and retrieve the Web site that includes the order form for ordering the consumer good. If the terminal is not actively operating an application, however, the terminal can read the data stored by the RFID transponder tag and store the information regarding the consumer good, such as until subsequent initiation of the E-mail application, at which point in time the stored data may be provided to the application. Additionally, or alternatively, the terminal can read the data, execute an E-mail application identified by the data, and as before, read the information regarding the consumer good into an E-mail composition.

Again referring to FIGS. 3A-3C, if the signaling tag has a tag type "Read/Write," as shown in block 72, and if the terminal has an active application operating on the terminal, the terminal can perform an action further based upon a state of the active application. In this regard, if the active application is in a state for receiving data, such as into a text field, the terminal can read data from the tag into the active application, as shown in blocks 74 and 76. If the active application is in a state of presenting data, such as a selected E-mail message, however, the terminal can write the presented data to the tag, as shown in blocks 78 and 80. On the other hand, if the signaling tag has a tag type "Read/Write," and the terminal does not have an active application operating on the terminal, as before (see block 70), the terminal can read data from the tag into the terminal and act upon the data, as shown in block 82.

As an example of a context in which a signaling tag may have "Read/Write" tag type, presume that a RFID transponder tag with such a "Read/Write" tag type is embedded in the same paper advertisement as above, except that the data stored by the RFID transponder tag identifies an organizer application presenting user contact information as being associated with the data. Also, presume that the paper advertisement indicates that customers interested in receiving more information regarding the consumer good can leave their contact information at the advertisement. If the terminal 10 is actively operating an E-mail application, and the E-mail application is in a state of receiving information into a composition, the terminal can read the information regarding the consumer good into the E-mail composition, as before. Also as before, if the terminal is actively operating a Web browser, and the Web browser is in a state of receiving a URL, the terminal can read the URL from the information and retrieve the Web site.

If the user of the terminal 10 desires to leave contact information (e.g., mailing address) to receive more information regarding the consumer good, and if the terminal is actively operating an organizer application that presents user contact information, the contact information can be written to the RFID transponder tag. Subsequently, then, the contact information can be retrieved, such as by a distributor of the consumer good, and information regarding the consumer good sent to the user based upon the contact information. If, on the other hand, the terminal is not actively operating an application, the terminal can read the data stored by the RFID transponder tag, and store the information regarding the consumer good. Additionally, or alternatively, the terminal can read the data, execute an organizer application identified by the data, and as before, write the user's contact information to the tag.

As described herein, when the signaling tag has a tag type "Read Only" or "Read/Write," terminal 10 typically reads the data from the tag and acts upon the data when the terminal does not have an active application operating on the terminal. It should be understood, however, that when the terminal does not have an active application operating on the terminal, the terminal need not read data from the tag or act upon the data. In this regard, the terminal can be configured to read data from the tag only when an active application is operating on the terminal.

As explained above, a transceiver 49 can be capable of operating as a tag 46, with the transceiver having a tag type "Transceiver in Show Mode." Thus, if the signaling tag has a tag type "Transceiver in Show Mode," as shown in block 84, and if the terminal 10 is actively operating an application, the terminal can perform an action further based upon a state of the active application operating on the terminal. In this regard, the terminal operates when the tag type is "Transceiver in Show Mode" much like the terminal operates when the tag type is "Read/Write." In contrast to operation when the tag type is "Read/Write," however, a transceiver operating as a tag typically does not itself store data as does a transponder tag generally. Thus, in contrast to operating the terminal when the tag type is "Read/Write," when the tag type is "Transceiver in Show Mode" the terminal typically transmits data to and/or receives data from the electronic device 44 associated with the transceiver, as opposed from the transceiver itself.

The data transmitted to and/or received from the electronic device 44 associated with the transceiver 49 can be determined in any of a number of different manners. In this regard, the data transmitted to the electronic device can be determined based upon data presented by an application actively operating on the terminal 10. Also, data received from the electronic device and the manner in which the data is handled can be determined based upon an application actively operating on the electronic device, or based upon data requested by the application actively operating on the terminal. For example, when the electronic device is actively operating an organizer application that presents contact information, the data received from the electronic device can comprise the contact information presented by the organizer application. Further, the data received from the electronic device can comprise default data, such as data stored in a "digital clipboard," as such is well known to those skilled in the art.

Also, whereas the terminal 10 can transmit and/or receive data from the electronic device 44 via the transceiver 49, the terminal typically transmits and/or receives the data from the electronic device via another means for sharing and/or obtaining data from the electronic device. For example, the terminal can transmit and/or receive data from the other electronic device via a infrared, Bluetooth, or any of a number of different wireless networking techniques, including WLAN techniques such as IEEE 802.11 techniques or the like. Thus, in one typical embodiment, the terminal can receive a tag type ("Transceiver in Show Mode") from the transceiver, and can also receive one or more parameters required for establishing communication with the electronic device associated with the transceiver. Then, the terminal can transmit data to and/or receive data from the electronic device via a infrared, Bluetooth, WLAN or the like.

In operation, then, when the signaling tag has a tag type "Transceiver in Show Mode," and if the terminal 10 has an active application operating in a state for receiving data, such as into a text field, the terminal can communicate with the electronic device 44 associated with the transceiver 49 (i.e., signaling tag) to receive data from the electronic device (via, e.g., infrared, Bluetooth, and/or WLAN from an active application operating on the electronic device) into the active application, as shown in blocks 86 and 88. If the active application is in a state of presenting data, such as a selected E-mail message, however, the terminal can communicate with the electronic device associated with the transceiver to send the presented data to the electronic device (via, e.g., infrared, Bluetooth, and/or WLAN to an active application operating on the electronic device, to memory, etc.), as shown in blocks 90 and 92. I If the signaling tag has a tag type "Transceiver in Show Mode," and the terminal 10 is not actively operating an application, the terminal can initiate communication, such as via infrared, Bluetooth, and/or WLAN, with the electronic device associated with the transceiver, as shown in block 94. The user of the terminal can thereafter operate the terminal to communicate with the electronic device in any of a number of different manners, as desired. For example, the user of the terminal can operate the terminal to transfer files, applications or the like between the terminal and the electronic device.

As will be appreciated, data transmitted to the electronic device 44 from the terminal 10 can, upon receipt, be acted upon by the electronic device in any of a number of different manners. For example, the electronic device can read the data into an application actively operating on the electronic device. If the electronic device is not actively operating an application into which the data can be read, the terminal can execute an application associated with the data or otherwise identified by the data, and read the data into the executed application. In addition to, or in lieu of, reading data into an application, the electronic device can store the data.

As an example of a context in which a signaling tag may have "Transceiver in Show Mode" tag type, presume that a radio frequency transceiver with such a "Transceiver in Show Mode" tag type is associated with a mobile station. If an E-mail application is actively operating on the terminal 10, and the E-mail application is in a state of receiving information into a composition, the terminal can communicate with the mobile station to receive content into the E-mail composition, such as from an active application, "digital clipboard, or another source identified by the E-mail application. If, on the other hand, the terminal is actively operating a photo editing application presenting an image, the terminal can transmit the image to the mobile station. Upon receipt of the image, then, the mobile station can execute a photo editing application (if not already actively operating on the mobile station) and read the image into the photo editing application, and can store the image, if so desired. If the terminal is not actively operating an application, the terminal can initiate communication with the mobile station, after which the user of the terminal can operate the terminal to communicate with the mobile station, such as to transfer files, applications or the like between the terminal and the mobile station.

As described herein, upon reading a tag type from a signaling tag, the terminal 10 can perform a predefined action based upon the tag type, and if the terminal is actively operating an application, further based upon the application and a state of the application. More particularly, depending upon the tag type, the terminal can read data from the signaling tag into an actively operating application when the application is in a state of receiving data, and can write data to the signaling tag when the application is in a state of presenting data. It should be understood, however, that after the terminal receives the tag type, the terminal need not automatically perform the predefined action based upon the tag type and, if the terminal is actively operating an application, the application and state of the application. In this regard, the terminal can determine the tag type from the signaling tag and thereafter notify a user of the terminal (via e.g., user interface speaker 34, ringer 36 and/or display 40, and/or vibrating battery pack) that the terminal can perform one or more predefined actions based upon the tag type. Thereafter, the terminal can be responsive to a user selection to thereby perform a predefined action based upon the tag type and a user selection.

According to one aspect of the present invention, all or a portion of the system of the present invention, such all or portions of the terminal 14, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 3A-C are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method in an apparatus, comprising:
receiving information regarding a signaling tag over a radio frequency identification interface,
determining whether an application is actively operating within the apparatus; and when there is an actively operating application:
performing a predefined action based upon said application and a state of said application, wherein said predefined action comprises at least one of:
(a) reading data from the signaling tag, or
(b) writing data to the signaling tag.

2. The method of claim 1, wherein when said actively operating application is in a state for receiving information, entering data read from the signaling tag into said actively operating application.

3. The method of claim 1, wherein when said actively operating application is in a state for presenting information, writing currently presented information to the signaling tag.

4. The method of claim 1, wherein said predefined action is further based upon the information received over said radio frequency identification interface.

5. The method of claim 4, wherein when the information received over said radio frequency identification interface indicates that the signaling tag is capable of at least receiving data and said actively operating application is in a state for presenting information, writing currently presented information to the signaling tag.

6. The method of claim 4, wherein when the information received over said radio frequency identification interface indicates that the signaling tag is capable of at least transmitting data and said actively operating application is in a state for receiving information, entering data read from the signaling tag into said actively operating application.

7. An apparatus comprising:
a radio frequency identification communication module;
at least one processor; and
at least one memory including executable instructions, the at least one memory and the executable instructions being configured to, in cooperation with the at least one processor, cause the apparatus to perform at least the following:
receive information regarding a signaling tag via the radio frequency identification communication module,
determine whether an application is actively operating within the apparatus; and when there is an actively operating application:
perform a predefined action based upon said application and a state of said application, wherein said predefined action comprises at least one of:
(a) read data from the signaling tag, or
(b) write data to the signaling tag.

8. The apparatus of claim 7, wherein when said actively operating application is in a state for receiving information, the at least one memory and the executable instructions being configured to, in cooperation with the at least one processor, cause the apparatus to enter data read from the signaling tag into said actively operating application.

9. The apparatus of claim 7, wherein when said actively operating application is in a state for presenting information, the at least one memory and the executable instructions being configured to, in cooperation with the at least one processor, cause the apparatus to write currently presented information to the signaling tag.

10. The apparatus of claim 7, wherein said predefined action is further based upon the information received over said radio frequency identification interface.

11. The apparatus of claim 10, wherein when the information received over said radio frequency identification interface indicates that the signaling tag is capable of at least receiving data and said actively operating application is in a state for presenting information, the at least one memory and the executable instructions being configured to, in cooperation with the at least one processor, cause the apparatus to write currently presented information to the signaling tag.

12. The apparatus of claim 10, wherein when the information received over said radio frequency identification interface indicates that the signaling tag is capable of at least transmitting data and said actively operating application is in a state for receiving information, the at least one memory and the executable instructions being configured to, in cooperation with the at least one processor, cause the apparatus to enter data read from the signaling tag into said actively operating application.

13. A computer program product comprising computer executable program code recorded on a computer readable storage medium, the computer executable program code comprising:
   code configured for causing receiving information regarding a signaling tag over a radio frequency identification interface,
   code configured for causing determining whether an application is actively operating within an apparatus; and when there is an actively operating application:
   code configured for performing a predefined action based upon said application and a state of said application, wherein said predefined action comprises at least one of:
   (c) reading data from the signaling tag, or
   (d) writing data to the signaling tag.

14. The computer program product of claim 13, further comprising code configured for causing entering data read from the signaling tag into said actively operating application when said actively operating application is in a state for receiving information.

15. The computer program product of claim 13, further comprising code configured for causing writing currently presented information to the signaling tag when said actively operating application is in a state for presenting information.

16. The computer program product of claim 13, wherein said predefined action is further based upon the information received over said radio frequency identification interface.

17. The computer program product of claim 16, further comprising a code configured to cause writing currently presented information to the signaling tag when the information received over said radio frequency identification interface indicates that the signaling tag is capable of at least receiving data and said actively operating application is in a state for presenting information.

18. The computer program product of claim 16, further comprising a code configured to cause entering data read from the signaling tag into said actively operating application when the information received over said radio frequency identification interface indicates that the signaling tag is capable of at least transmitting data and said actively operating application is in a state for receiving information.

* * * * *